Figure 1:
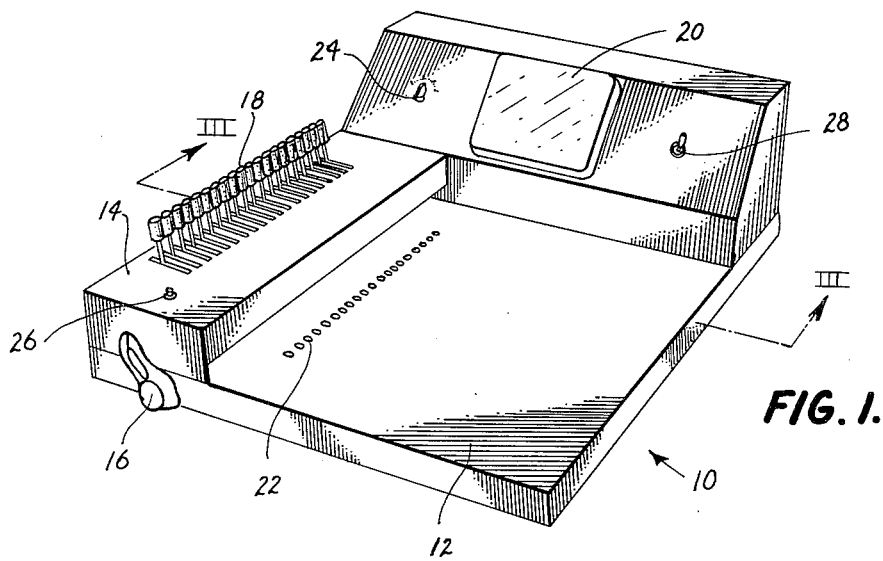

Oct. 5, 1965  J. L. BRITTAN  3,209,471
COMPUTER

Filed April 2, 1962  2 Sheets-Sheet 1

INVENTOR.
JOHN L. BRITTAN
BY
ATTORNEYS

Oct. 5, 1965  J. L. BRITTAN  3,209,471
COMPUTER
Filed April 2, 1962  2 Sheets-Sheet 2
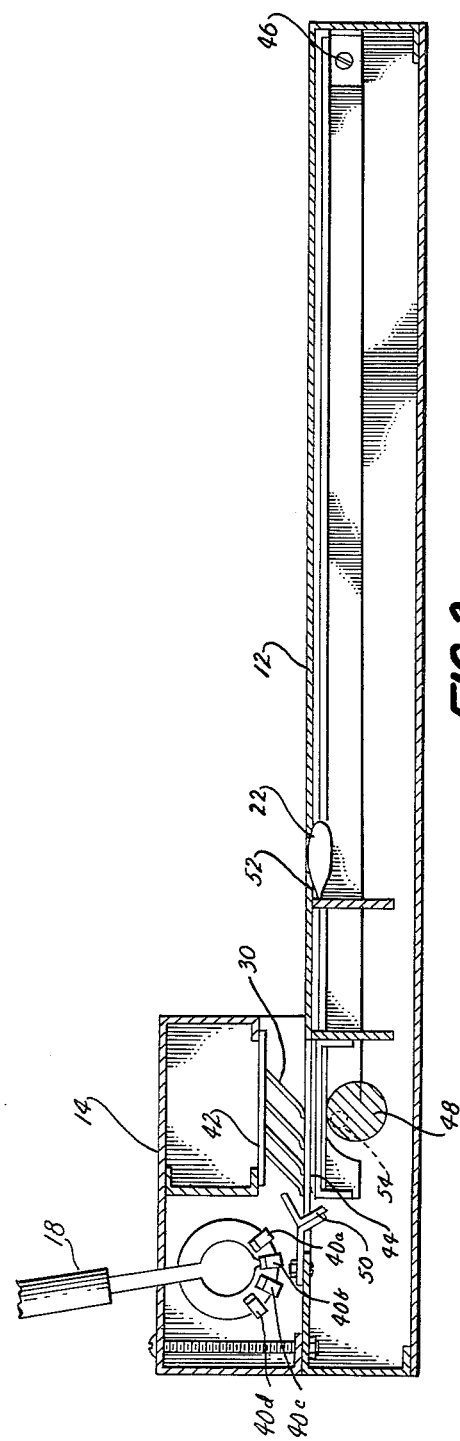
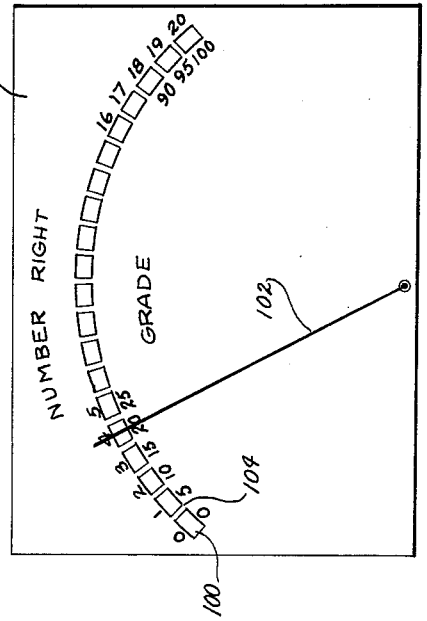
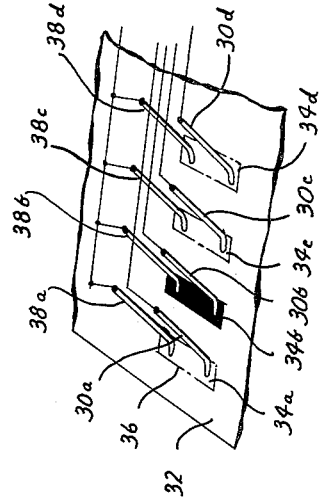
INVENTOR.
JOHN L. BRITTAN
BY
ATTORNEYS

| United States Patent Office | 3,209,471
Patented Oct. 5, 1965 |
|---|---|

3,209,471
COMPUTER
John L. Brittan, 917 Brunn, St. Joseph, Mich.
Filed Apr. 2, 1962, Ser. No. 184,160
6 Claims. (Cl. 35—48)

This invention concerns grading machines for examination papers, and more particularly a device in which the correct grade is directly indicated on a meter face and the incorrect answers are simultaneously pointed out on the test sheet itself.

Grading machines for examination papers as such have been known for some time. However, they have usually been of complex design, and have consequently been either too expensive to permit their extensive use, or unreliable in their functioning, thus causing widespread complaints on the part of the students.

A simple type of grading machine heretofore known worked on the principle of passing electrical currents through markings made on the examination papers with special pencils and adding these currents electrically to form a meter indication indicative of the number of questions answered correctly. This device had the disadvantage, however, of being sensitive to the conductivity of the markings on the paper; consequently, it required the use of special pencils and had a tendency to give a false indication if one of the markings was heavily defective, or if a number of the markings were slightly defective.

The present invention overcomes this difficulty by using the conductive markings to trigger the operation of individual electrical circuits which, once triggered, operate independently of the marking and inject a steady current of predeterminable magnitude into the measuring circuit regardless of the quality of the marking on the paper. At the same time, the firing of any given circuit causes a lamp connected into that circuit to light underneath the paper with sufficient intensity to shine therethrough. It is consequently possible for the instructor to mark the incorrect answer by placing a check mark on the paper adjacent the location of each light that fails to light when the paper is sensed. The fact that the continued actuation of the sensing circuits is independent of the marking, once the circuits have fired, makes it possible to retain the reading on the machine even after the paper has been released and until the reading is manually cancelled prior to grading the next paper.

It is therefore the object of this invention to provide a simple electronic grading device capable of sensing conductive markings on a paper and producing a single indication directly representative of the number of correct answers which is not dependent on the quality of the markings themselves.

It is another object of this invention to provide a grading machine of the type described in which the position of correct answer is indicated by the lighting of indicating lamps adjacent each correctly placed marking.

It is another object of this invention to provide a device of the type described which is simple, inexpensive, and capable of ready adjustment to compensate for wear or aging of its parts.

It is still another object of this invention to provide a device of the type described in which the indicating meter scale is divided into blocks representing ranges into which the meter indication can fall for a given number of correct answers, taking into account the accuracy tolerances of the machine and the normal variation in its parameters.

Figure 2:
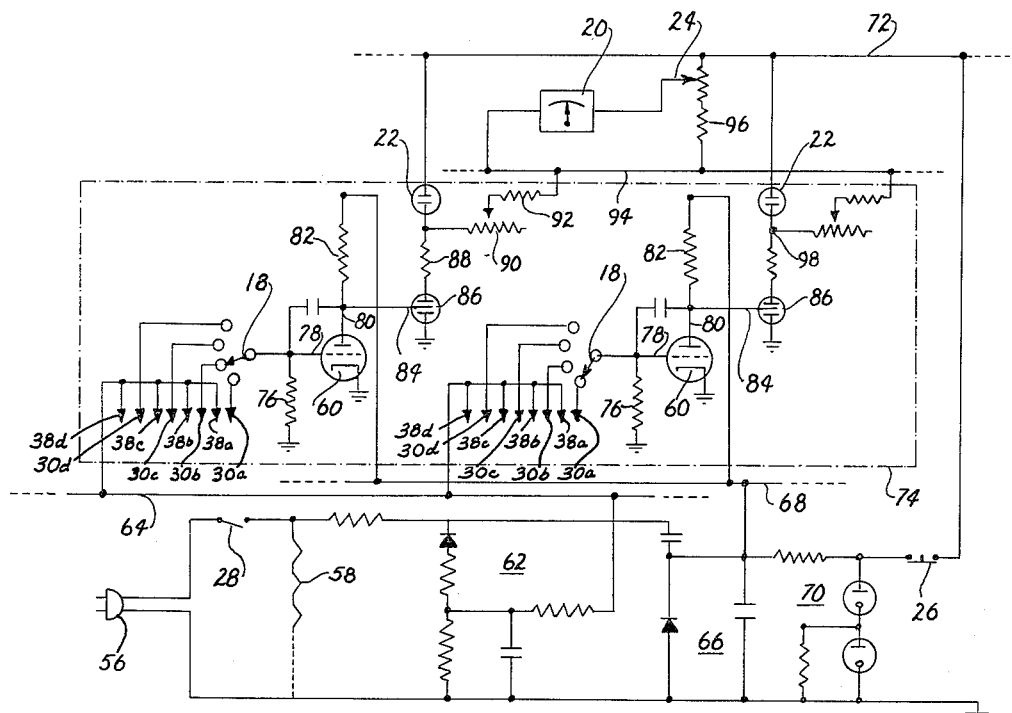

These and other objects of the invention will be apparent from the following specification, taken in connection with the accompanying drawings in which:

FIG. 1 is a top perspective view of the device of this invention;

FIG. 2 is a partial circuit diagram of the device;
FIG. 3 is a vertical section along line III—III of FIG. 1;
FIG. 4 is a fragmentary perspective view showing the sensing fingers in their sensing position; and
FIG. 5 is a detailed view of the meter face.

Bascally, the grading device of this invention operates by sensing the electrical resistance of those spaces on the answer sheet in which pencil markings should appear if the question has been answered correctly. If no pencil mark appears in the proper answer space, the resistance of the space is extremely high, but if a pencil mark does appear in the space, the resistance of the space is comparatively low. Inasmuch as the marking is connected into the grid circuit of a control tube in which no current flows, the operation of the apparatus does not depend on the exact resistance value of the sensed space, but only on the order of magnitude of the resistance of the space with respect to the fixed grid bias resistor. If the resistance of the space is relatively high (more than 100 times the value of the grid bias resistor in a preferred embodiment), grid voltage applied to the control tube is sufficiently near ground potential to cause the control tube plate current to exceed its critical value. If, on the other hand, the resistance of the sensed space is less than the aforesaid amount, the grid of the control tube is driven negatively at least sufficiently to reduce the plate current below its critical value. When the control tube plate current falls below its critical level, the plate voltage rises to the firing level of the trigger element of a three-element gas-filled cold-cathode tube which is connected to the plate of the control tube. When the cold-cathode tube fires, it establishes a current path of fixed resistance in which the current flow is independent of the actions of the other circuit elements once the cold-cathode tube has been fired. The sum of the currents flowing through those cold-cathode tubes which have fired is fed through a meter whose deflection indicates the total number of cold-cathode tubes that have fired, i.e. the total number of correct answers.

In addition, an indication of the correctness of individual answers is provided by indicator lamps which are physically positioned adjacent the space on the answer sheet in which the correct answer should appear when the sheet is in sensing position, the indicator lights being associated with the circuit of the cold-cathode tubes so as to be lit whenever the cold-cathode tube associated therewith is conducting. In the preferred embodiment, the indicator lamps also serve as voltage regulators to stabilize the meter indications.

Mispositioning of a marking in its allotted sensing area is compensated for by causing the sensing fingers to travel across the entire sensing area during the sensing operation.

Referring now to the drawings, the device of this invention is generally shown at 10 in FIG. 1. The machine 10 has a platform 12, a sensing head 14, a platen actuating lever 16, a series of selector switches 18, a totalizer meter 20, a series of indicator lights 22, a meter adjustment 24, a cancel button 26, and a power switch 28.

Referring now to FIG. 3, it will be seen that the sensing head 14 contains a plurality of wafer switches 18 which, in the embodiment shown, can be set to any one of four positions to selectively connect any one of the four sensing fingers 30 into the sensing circuit. In the embodiment shown, it is assumed that for each question, four possible answer spaces are provided on the answer sheet. Each of the sensing fingers 30 corresponds to one of these four spaces, as is more clearly shown in FIG. 4.

FIG. 4 shows the sheet of paper 32 to be graded and the relationship of the sensing fingers thereto during the sensing process. For each question, there are four sensing areas 34a through 34d defined by appropriate printed indicia such as 36. For the purposes of the present discussion, it will be assumed that the correct answer is to be indicated by making a pencil mark in the area 34b. It will be noted that each of the sensing areas 34a through 34d is sensed by one of the sensing fingers 30a through 30d, and also by one of the sensing fingers 38a through 38d. The sensing fingers 38a through 38d are connected together, whereas the sensing fingers 30a through 30d are individually connected to the contacts 40a through 40d of selector switch 18, as is more clearly shown in the circuit diagram of FIG. 2.

The sensing fingers 30 and 38 are firmly anchored in the fixed insulating plate 42 but are made of resilient material so that when the platen 44 is moved upwardly in a manner hereafter described to bring the paper to be graded into contact with the sensing fingers, the tips of the sensing fingers are deflected by the paper and travel from right to left across the sensing area 34 as the paper is being pressed more and more strongly against them by the movement of the platen 44.

As will be best seen from FIG. 3, the platen 44 is hinged under the extreme right hand end of the platform 12 on a pivot 46 so that its movement under the influence of the rotation of eccentric 48 is practically vertical. Lateral guides 50 and end guides (not shown) are provided in the sensing head to insure accurate positioning of the paper during the sensing operation.

Directly to the right of each quadruple pair of sensing fingers 30, 38 is an indicator light 22 positioned under an opening 52 in the platform 12. The purpose of the indicator light 22 is to indicate the correctness of the answer sensed by the sensing finger pairs 30, 38 directly to its left. The rotation of the eccentric 48 on which the platen 44 rests is accomplished by rotating the platen actuating lever 16 about its shaft 54. The shaft 54 may be provided with rotation limiting means and spring return means (not shown) as necessary.

Turning now to FIG. 2, it will be seen that the apparatus of this invention is supplied with 110 volt A.C. power through a conventional plug 56. When not in use, the device can be turned off by a power switch 28. The filaments 58 of the control tubes 60 are series connected across the power supply as shown in FIG. 2. A rectifier-filter network 62 feeds a D.C. plate bias of approximately −120 volts into grid bias bus 64. A second rectifier-filter network 66 feeds a plate bias voltage of +300 volts to the plate bus 68. A voltage regulator network 70 supplies a well regulated meter bias voltage of +180 volts to the meter bias bus 72. The circuit of the meter bias bus 72 can be interrupted by depressing the cancel button 26.

The area enclosed by the dot-dash line 74 in FIG. 2 includes two of the sensing circuits which may be duplicated in any desired number, depending on the number of questions to be graded simultaneously. In the particular embodiment shown, the two identical circuits included in the box 74 are representative of the twenty sensing circuits of the device. As will be seen from FIG. 2, a negative bias of 120 volts is supplied to the sensing fingers 38a through 38d from bus 64. If, as has been shown in FIG. 4, a pencil marking has been made in space 34b, sensing fingers 38b and 30b will be connected electrically, so that the marking and the grid bias resistor 76 form a voltage divider whose center tap is connected to the control tube grid 78. The purpose of the control tubes 60 is to prevent excessive current from being drawn through the pencil markings, as would be the case if the markings were used directly to fire the trigger elements of neon tubes 86. The capacitor 75 serves as a negative feedback loop to prevent transients from firing the sensing circuits.

The quality of the electrical connection between the sensing fingers is not material as long as the electrical resistance of the marking is not more than 100 times the resistance of the grid bias resistor 76—a requirement amply satisfied by any ordinary pencil stroke. Inasmuch as, in the example selected, switch 18 is in the position in which sensing finger 30b is connected to the grid 78 of the control tube 60, the potential of grid 78 will be at least 1.5 volts, and normally much more, negative with respect to ground. In this condition, the plate voltage of the control tube 60 is at least +140 volts, and normally substantially that of bus 68, because there is only a relatively small voltage drop across plate resistor 82 as a result of the low plate current caused by the negatively biased grid. Consequently, the potential of the trigger element 84 of the three-element cold-cathode neon tube 86 exceeds its critical value with respect to ground, and the neon tube 86 fires. The current through the neon tube 86 flows through current limiting resistor 88, balance control 90, and resistor 92 to the meter bus 94. From the meter bus 94, the currents generated by all the fired neon tubes 86 combine to flow through resistor 96 and meter adjustment control 24 to the meter bias bus 72. The meter 20 reads the total voltage drop across the resistor 96 and the portion of the meter adjustment control lying below the slide of the potentiometer 24. Inasmuch as the voltage in meter bias bus 72 is accurately regulated, the total current generated by any given number of neon tubes 86 is accurately predeterminable and varies only as a result of the aging of the neon tubes themselves. The balance control 90 is provided so as to permit initial adjustment of each sensing circuit so that the current flowing through it upon firing of neon tube 86 is the same as that flowing in the other sensing circuits under like conditions.

Two-element neon indicator lights 22 are connected between the current limiting resistor 88 and the meter bias bus 72 in each sensing circuit to visually indicate the correctness of any particular answer as hereinbefore explained, but in addition to this the indicator lights 22 also have another function: The current flowing through potentiometer 90, resistor 92, resistor 96, and potentiometer 24 for each sensing circuit is in effect governed by the voltage drop across the neon indicator light 22. Consequently, the indicator light serves as a voltage regulator, and because it is much more stable than the three-element tube 86, it prevents fluctuation of the indication of meter 20.

It will be noted that once the neon tube 86 has fired, it cannot again be extinguished except by removal of the bias voltage in meter bias bus 72. Consequently, a correct answer indication will be obtained even if the sensing fingers 30, 38 associated with the correct space are bridged only momentarily by the pencil mark during their travel laterally across the sensing area. Therefore, and also because of its great sensitivity, the device of this invention is capable of sensing even pencil marks which are too narrow for ordinary sensing devices or are off center.

If the switch 18 is set to a position different from the one in which the pencil mark appears (as in the right-hand portion of box 74), no connection will be established between bus 64 and grid 78. In this condition, grid 78 will be substantially at ground potential. In this condition, grid 78 will be substantially at ground potential. In this condition, control tube 60 conducts sufficiently to cause a substantial voltage drop across plate resistor 82. Consequently, the potential of plate 80 drops to near ground level and trigger element 84 is at too low a potential to permit firing of the neon tube 86. As long as the neon tube 86 is extinguished, the potential difference between point 98 and meter bias bus 72 is insufficient to light indicator light 22, and the unlighted condition of indicator light 22 signifies that the answer sensed by the unfired sensing circuit is wrong.

Turning now to FIG. 5, it will be seen that the meter scale in accordance with this invention is arranged so that the number of correct answers is indicated by spaced blocks on the meter face. The blocks 100 are so positioned that when the instrument is in perfect adjustment, the pointer 102 will come to rest in approximately the center of the block corresponding to the number of correct answers sensed by the device. The advantage of this block layout over the customary graduated scale is that accuracy of the answer is assured by an indication lying unequivocally within a given one of the blocks 100. If the pointer 102 comes to rest in the space 104 between two blocks 100, the operator is immediately advised thereby that the device is out of adjustent and has to be recalibrated. If the indications are consistently on the low side or the high side of the boxes 100, a misadjustment of the overall meter sensitivity is indicated, and this can be corrected by resetting the meter adjustment 24. On the other hand, if the indications appear to be erratically sometimes on the low side and sometimes on the high side, unbalance of one or more of the individual sensing circuits is indicated. With the box design of the meter face, it is a simple matter to find the unbalanced sensing circuit by inserting an answer sheet on which all answers are correct and sensing it repeatedly, each time with a different one of the switches 18 set so as to make its answer incorrect, until the defective circuit is found by observing an indication which is noticeably different from the other indications. The inventive arrangement thus eliminates the necessity of providing servicing equipment to adjust unbalanced sensing circuits in the device.

*Operation*

In operation, the instructor first determines for each of the twenty questions gradeable by the instrument of the embodiment shown, whether the correct answer shall be *a*, *b*, *c*, or *d*. For each question, he sets the switch 18 coresponding to that question to the proper answer. He then inserts the sheet to be corrected underneath the sensing head 14 until its edge hits the guide 50. With the sheet in place, the instructor rotates the platen actuating lever 16 until the platen presses the paper to be graded into contact with the sensing fingers 30, 38 and an indication is registered on the totalizer meter 20. The platen actuating lever 16 may now be released, and a check mark may be made on the paper adjacent each of the indicator lights 22 that have failed to light. If this is done, the paper upon being removed from the device will show check marks adjacent those questions to which the wrong answer has been given. The grade can be read directly off the meter face and can be immediately written on the paper. The indication remains on the indicator light 22 and on the totalizer meter 20 even after the paper has been withdrawn from the machine, until the cancel button 26 is depressed to ready the machine for the next grading operation.

When the power switch 28 is first closed, all indicator lights 22 will immediately light, and the totalizer meter 20 will indicate a perfect score. This is true because until the heaters of the control tubes 60 have heated up to the point where the cathodes of the control tubes 60 can become emissive, no current can flow in the control tubes 60, and consequently all the neon tubes 86 fire. This phenomenon provides a quick check of the fact that all sensing circuits are operative each time the device is turned on. If an attempt is made to grade a paper before the control tubes 60 have had time to heat up, an indication of this fact is given immediately to the operator in that when the cancel button 26 is released, one or more of the indicator lights 22 will immediately relight, before the platen actuating lever 16 has been rotated.

It will be seen that the present invention provides an efficient, economical, and accurate grading device. Obviously, the invention can be carried out in many ways, and I therefore do not desire to be limited by the embodiment shown or by the description herein, but only by the scope of the following claims.

I claim:

1. An electrical grading machine for examination papers, comprising: a platen for supporting a paper to be graded; a plurality of pairs of sensing means; means for bringing said each of said pairs of sensing means into contact with a predetermined sensing area on said paper; a plurality of electrical output circuits adapted to be connected to power supply means; triggering means electrically associated with said electrical output circuits and normally preventing action in said output circuits but capable of selectively electrically connecting some of said pairs of sensing means each to one of a plurality of said electrical output circuits; each of said connected pairs of sensing means beng arranged to trigger the flow of current in the output electrical circuit to which it is connected through said triggering means when the sensing area associated with said sensing means is rendered electrically conductive, regulator means causing the current flow in said output electrical circuit to be independent of the conductivity of said sensing area; and indicating means for indicating the sum of the currents flowing in said output electrical circuits.

2. The device of claim 1, further including a plurality of second indicating means each connected to one of said electrical circuits and responsive to current flow therein, and each positioned so as to be aligned with the sensing area associated therewith when said paper is in position to be sensed.

3. The machine of claim 1, in which said indicating means is a meter, the graduations of the dial of said meter being in the form of delineated areas each representing current flow in a predetermined number of said electrical circuits, and each encompassing a range of indications representative of the range within which the sum of said currents in said predetermined number of electrical circuits can lie in view of the accuracy tolerances of said machine.

4. The device of claim 1, further comprising a plurality of balance control means each associated with one of said electrical circuits and arranged to control the current flowing through its circuit when its circuit is triggered, and a single sensitivity control associated with said indicating means and arranged to control the magnitude of said sum of current flows necessary to produce a given indication on said indicator.

5. An electrical grading machine for examination papers, comprising: a platen for supporting a paper to be graded; a plurality of pairs of sensing means; means for bringing said each of said pairs of sensing means into contact with a predetermined sensing area on said paper; a plurality of electrical circuits including triggering means; connector means for selectively connecting some of said pairs of sensing means each to triggering means in one of a plurality of electrical circuits; each of said connected pairs of sensing means being arranged to trigger the flow of current in the electrical circuit to which it is connected when the sensing area associated with said sensing means is rendered electrically conductive, the current flow in said electrical circuit being independent on the conductivity of said sensing area; first indicating means for indicating the sum of the currents flowing in said electrical circuits; a plurality of second indicating means each connected to one of said electrical circuits and responsive to current flow therein, and each positioned so as to be aligned with the sensing area associated therewith when said paper is in position to be sensed; gas-filled second indicating means each connected to one of said electrical circuits and responsive to current flow therein, said second indicating means being connected across said first indicating means to serve as voltage regulators to stabilize the indication of said first indicating means.

6. An electrical grading machine for examination papers upon which conductive markings are placed comprising: a plurality of pairs of electrically conductive sensing elements; means for supporting and positioning a marked paper to be graded, and for bringing said pairs of elements into contact with said paper; a plurality of electrical output circuits, each having an electron tube forming a trigger means for the respective output circuit; each of said electron tubes being a gas-filled tube forming a voltage regulator for the respective output circuit, and forming a visible indicator for the respective output circuit; a plurality of triggering circuits each electrically connected between a pair of sensing elements and the grid of said electron tube; said triggering circuits being individually selectively energized with the occurrence of electrically conductive markings between respective pairs of elements to trigger respective output circuits.

References Cited by the Examiner

UNITED STATES PATENTS

| | | | |
|---|---|---|---|
| 1,997,178 | 4/35 | Johnson | 35—48 |
| 2,048,976 | 7/36 | Sveda et al. | 35—48 |
| 2,113,620 | 4/38 | Johnson | 35—48 |
| 2,229,009 | 1/41 | Berry | 324—131 |
| 2,310,437 | 2/43 | Johnson | 35—48 |
| 2,528,828 | 11/50 | Henry | 35—48 |
| 3,003,259 | 10/61 | Sullivan | 35—48 |

JEROME SCHNALL, *Primary Examiner.*

A. BERLIN, LAWRENCE CHARLES, *Examiners.*